US012469955B2

(12) United States Patent
Lin et al.

(10) Patent No.: US 12,469,955 B2
(45) Date of Patent: Nov. 11, 2025

(54) ANTENNA PACKAGING STRUCTURE AND MANUFACTURING METHOD THEREOF

(71) Applicant: JCET GROUP CO., LTD., Wuxi (CN)

(72) Inventors: Yaojian Lin, Wuxi (CN); Chen Xu, Wuxi (CN); Shuo Liu, Wuxi (CN); Chenye He, Wuxi (CN)

(73) Assignee: JCET GROUP CO., LTD., Wuxi (CN)

( * ) Notice: Subject to any disclaimer, the term of this patent is extended or adjusted under 35 U.S.C. 154(b) by 160 days.

(21) Appl. No.: 18/035,514

(22) PCT Filed: May 19, 2021

(86) PCT No.: PCT/CN2021/094565

§ 371 (c)(1),
(2) Date: May 5, 2023

(87) PCT Pub. No.: WO2022/105160

PCT Pub. Date: May 27, 2022

(65) Prior Publication Data

US 2023/0335882 A1 Oct. 19, 2023

(30) Foreign Application Priority Data

Nov. 17, 2020 (CN) ......................... 202011285780.0

(51) Int. Cl.

| | |
|---|---|
| ***H01Q 1/22*** | (2006.01) |
| ***H01Q 1/38*** | (2006.01) |
| ***H01Q 9/04*** | (2006.01) |

(52) U.S. Cl.
CPC ............. *H01Q 1/2283* (2013.01); *H01Q 1/38* (2013.01); *H01Q 9/0414* (2013.01)

(58) Field of Classification Search
CPC ...... H01Q 1/2283; H01Q 1/38; H01Q 9/0414; H01Q 1/40; H01Q 1/526; H01Q 21/0075; H01L 23/66
See application file for complete search history.

(56) References Cited

U.S. PATENT DOCUMENTS

2020/0203817 A1* 6/2020 Chiang ................ H01Q 1/2283
2023/0389173 A1* 11/2023 Lin ........................ H05K 1/165

FOREIGN PATENT DOCUMENTS

| | | | |
|---|---|---|---|
| CN | 107342233 | A | 11/2017 |
| CN | 108305856 | A | 7/2018 |
| CN | 110112110 | A | 8/2019 |
| CN | 110148587 | A | 8/2019 |
| CN | 211376638 | U | 8/2020 |

* cited by examiner

*Primary Examiner* — David E Lotter
(74) *Attorney, Agent, or Firm* — MUNCY, GEISSLER, OLDS & LOWE, P.C.

(57) ABSTRACT

The present invention provides an antenna packaging structure and a manufacturing method thereof. An antenna and a chip are respectively disposed on two sides of a substrate layer, antenna layers are formed by an antenna support member, a first antenna layer located above the antenna support member and a second antenna layer located below the antenna support member together, and interlayer dielectrics of the antenna support member and the antenna layers are low dielectric loss materials, so that a heterogeneous and isomerous antenna structure is formed, thereby reducing the problems such as current leakage and stray capacitance in the packaging structure caused by dielectric loss, and reducing a size of the antenna packaging structure.

20 Claims, 4 Drawing Sheets

ANTENNA PACKAGING STRUCTURE AND MANUFACTURING METHOD THEREOF

CROSS REFERENCE TO RELATED APPLICATIONS

The present invention is a 35 U.S.C. § 371 National Phase conversion of International (PCT) Patent Application No. PCT/CN2021/094565, filed on May 19, 2021, which claims benefit of Chinese Application No. 202011285780.0, filed on Nov. 17, 2020, the disclosure of which is incorporated by reference herein. The PCT International Patent Application was filed and published in Chinese.

TECHNICAL FIELD

The present invention relates to the field of packaging technologies, in particular to an antenna packaging structure and a manufacturing method thereof.

BACKGROUNDING

With the popularity of high-tech electronic products and the increase of people's demands, especially for meeting the mobile demand, most high-tech electronic products have increased a function of wireless communication. At present, wireless communication equipment usually includes an antenna module and one or more integrated circuits. The antenna module and the integrated circuit may be disposed in several different ways (for example, antenna-in-package (AIP), antenna-on-package (AOP), and antenna-on-chip (AOC)).

Electrical signals between the antenna module and the integrated circuit usually need to be transmitted through one or more conductive circuits and/or one or more through holes. These circuits and through holes are made of or filled by conductive materials, and are in contact with and/or at least partially surrounded by dielectric materials. Since the conventional dielectric materials (such as silicon or molding compounds) have higher dielectric loss, problems such as current leakage and stray capacitance are easily generated. Moreover, due to limited performances of the conventional dielectric materials, the reliability of packaging structures under conditions such as high temperature and high voltage is poor, which is not conducive to miniaturization of the packaging structures.

SUMMARY

An object of the present invention is to provide an antenna packaging structure and a manufacturing method thereof.

The present invention provides an antenna packaging structure. The antenna packaging structure includes: a substrate layer, at least one antenna support member, a first antenna layer, a plastic packaging layer and at least one chip;

- the substrate layer includes at least one chip circuit layer, at least one antenna control layer and at least one second antenna layer which are stacked in sequence, and a dielectric loss tangent value of an interlayer dielectric of the second antenna layer is less than 0.01;
- the antenna support member is disposed on the second antenna layer, and has a dielectric loss tangent value less than 0.01;
- the first antenna layer is disposed on the antenna support member and electrically connected to the second antenna layer through electromagnetic radiation or physical contact;

- the chip is disposed on the chip circuit layer relative to the antenna support member; and
- the plastic packaging layer wraps the substrate layer, the antenna support member, the first antenna layer and the chip.

As a further improvement of the present invention, the antenna support member is one or more of an organic composite substrate, a glass part and a low-temperature co-fired ceramic part.

As a further improvement of the present invention, at least an interlayer dielectric material of the second antenna layer is resin with a dielectric constant not greater than 3.9 or a polymer dielectric material with filler.

As a further improvement of the present invention, the antenna control layer includes an antenna signal control circuit and an antenna signal sending and receiving circuit.

As a further improvement of the present invention, an upper surface of the antenna support member is further provided with a first moisture barrier layer, and the first moisture barrier layer wraps the first antenna layer and is exposed to or buried in the plastic packaging layer.

As a further improvement of the present invention, the antenna packaging structure further includes interconnection structural members disposed on the second antenna layer and/or the chip circuit layer, the interconnection structural members on the second antenna layer are at least electrically connected to a grounding circuit of the substrate layer, and the interconnection structural members on the chip circuit layer are electrically connected to the substrate layer.

As a further improvement of the present invention, the interconnection structural member includes a main body member made of a dielectric material, and a conductive hole at least located inside the main body member and configured to communicate upper and lower surfaces of the main body member, a metal connector or conductive filler is disposed in the conductive hole to be at least electrically connected to the grounding circuit layer, and the interconnection structural members disposed on one side of the second antenna layer are distributed in gaps and at peripheral sides of the antenna support member.

As a further improvement of the present invention, parts of the interconnection structural members located on both sides of the packaging structure are further provided with lateral antenna layers, and the lateral antenna layers are disposed toward side edges of the antenna packaging structure.

As a further improvement of the present invention, a side wall of the interconnection structural member is provided with a heat-radiating structural member and/or a second moisture barrier layer, and the second moisture barrier layer is exposed to or buried in an outer side of the plastic packaging layer.

As a further improvement of the present invention, the plastic packaging layer includes a first plastic packaging layer and a second plastic packaging layer, the first plastic packaging layer at least wraps an upper surface of the substrate layer, a side surface of the antenna support member, side surfaces of the interconnection structural members and the first antenna layer, the second plastic packaging layer at least wraps a side surface of the chip and the side surfaces of the interconnection structural members, and a material of the first plastic packaging layer and a material of the second plastic packaging layer are different.

As a further improvement of the present invention, the antenna packaging structure is further provided with an electromagnetic shielding layer at the outer side of the packaging layer; the electromagnetic shielding layer at least covers a side direction of the chip and a side direction of the chip circuit layer; the electromagnetic shielding layer includes an adhesive layer attached to the plastic packaging layer, a protective layer exposed to air, and a main shielding layer disposed between the adhesive layer and the protective layer; and the side wall of the interconnection structural member is provided with a metal structural member, wherein the metal structural member is exposed to the plastic packaging layer and electrically connected to the electromagnetic shielding layer in a grounding way, and part of the electromagnetic shielding layer forms pads on a back surface of the chip or is bonded to the back surface of the chip through the drilled plastic packaging layer to form the pads.

As a further improvement of the present invention, the antenna packaging structure further includes a microwave integrated circuit and/or a power management chip and/or a passive device disposed on the chip circuit layer.

The present invention further provides a packaging method of an antenna packaging structure, including the steps:

- providing a temporary carrier plate, and disposing a chip circuit layer, an antenna control layer and at least one second antenna layer on the temporary carrier plate to form a substrate layer, the second antenna layer being located on the antenna control layer and taking a dielectric material with a dielectric loss tangent value less than 0.01 as an interlayer dielectric;
- disposing interconnection structural members on the substrate layer, the interconnection structural members being electrically connected to a grounding circuit layer on the substrate layer;
- disposing at least one antenna support member with a dielectric loss tangent value less than 0.01 on the second antenna layer, and disposing a first antenna layer on the antenna support member;
- filling a first plastic packaging layer to wrap the substrate layer, the interconnection structural members, the antenna support member and the first antenna layer; and
- removing the temporary carrier plate, disposing the interconnection structural members and at least one chip on the chip circuit layer, forming a second plastic packaging layer by filling, and forming a single antenna packaging structure by cutting.

As a further improvement of the present invention, the antenna support member is one or more of an organic composite substrate, a glass part and a low-temperature co-fired ceramic part.

As a further improvement of the present invention, the first plastic packaging layer at least wraps an upper surface of the substrate layer, a side surface of the antenna support member, side surfaces of the interconnection structural members and the first antenna layer, the second plastic packaging layer at least wraps a side surface of the chip and the side surfaces of the interconnection structural members, and a material of the first plastic packaging layer and a material of the second plastic packaging layer are different.

As a further improvement of the present invention, at least an interlayer dielectric material of the second antenna layer is resin with a dielectric constant not greater than 3.9 or a polymer dielectric material with filler.

As a further improvement of the present invention, the chip circuit layer includes an antenna signal control circuit and an antenna signal sending and receiving circuit.

As a further improvement of the present invention, the packaging method further includes the step:

- forming a first moisture barrier layer on an upper surface of the antenna support member, the first moisture barrier layer wrapping the first antenna layer.

As a further improvement of the present invention, the interconnection structural member includes a main body member made of a dielectric material, and a metal connector at least located inside the main body member and configured to communicate upper and lower surfaces of the main body member, and the metal connector is at least electrically connected to the grounding circuit layer on the substrate layer.

As a further improvement of the present invention, the interconnection structural members disposed on one side of the second antenna layer are distributed in gaps and at peripheral sides of the antenna support member.

As a further improvement of the present invention, parts of the interconnection structural members located on both sides of the packaging structure are further provided with lateral antenna layers, and the lateral antenna layers are disposed toward side edges of the antenna packaging structure.

As a further improvement of the present invention, a side wall of the interconnection structural member is provided with a heat-radiating structural member and/or a second moisture barrier layer, and the second moisture barrier layer is exposed to or buried in the plastic packaging layer.

As a further improvement of the present invention, before forming the single antenna packaging structure by cutting, the packaging method further includes the steps:

- partially cutting the first plastic packaging layer or the second plastic packaging layer; and
- sequentially depositing an adhesive layer, a main shielding layer and a protective layer on the outer side of the antenna packaging structure to form an electromagnetic shielding layer, the electromagnetic shielding layer at least covering the chip and the chip circuit layer.

As a further improvement of the present invention, the antenna packaging structure further includes a microwave integrated circuit, a power management chip and a passive device disposed on the chip circuit layer.

The present invention has the beneficial effects that an antenna and the chip are respectively disposed on two sides of the substrate layer, the antenna layers are formed by the antenna support member, the first antenna layer located above the antenna support member and the second antenna layer located below the antenna support member together, and the interlayer dielectrics of the antenna support member and the antenna layers are low dielectric loss materials, so that a heterogeneous and isomerous antenna structure is formed, thereby reducing the problems such as current leakage and stray capacitance in the packaging structure caused by dielectric loss, and reducing a size of the antenna packaging structure.

DETAILED DESCRIPTION

In order to clarify the objects, technical solutions and advantages of the present application, the technical solutions of the present application will be described clearly and fully in combination with specific embodiments and corresponding accompanying drawings of the present application. It is obvious that the described embodiments are just a part but not all of the embodiments of the present application. Based on the embodiments of the present application, those of ordinary skill in the art can obtain all other embodiments, without any inventive work, which should be within the protection scope of the present application.

The embodiments of the present invention will be described in detail below, and examples of the embodiments are illustrated in the accompanying drawings. The reference signs which are the same or similar throughout the accompanying drawings represent the same or similar elements or elements with the same or similar functions. The embodiments described below with reference to the accompanying drawings are exemplary and intended to be illustrative only, and are not to be construed as limitations to the present invention.

The terms "upper", "lower", "back", "front", and the like as used here, which denote spatial relative positions, describe the relationship of a unit or feature relative to another unit or feature in the accompanying drawings for the purpose of illustration. The terms of the spatial relative positions may include different orientations of the device in use or operation other than the orientations shown in the accompanying drawings. For example, the units that are described as being located "below" or "above" other units or features will be located "below" or "above" other units or features if the apparatus in the accompanying drawings is turned upside down. Thus, the exemplary term "below" can encompass both the orientations of "below" and "above".

Figure 1:
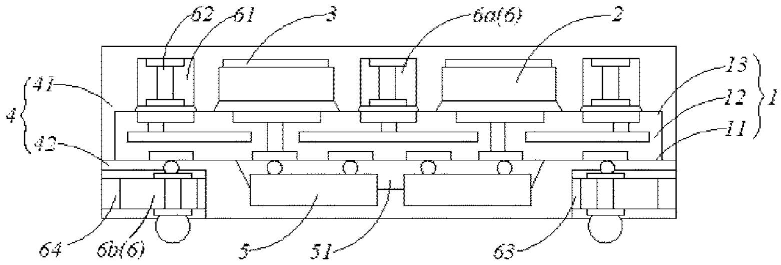
FIG. 1 is a schematic diagram of an antenna packaging structure in an embodiment of the present invention.

As shown in FIG. 1, the present invention provides an antenna packaging structure. The antenna packaging structure includes a substrate layer 1, at least one antenna support member 2, a first antenna layer 3, a plastic packaging layer 4, at least one chip 5, and interconnection structural members 6.

The substrate layer 1 includes a chip circuit layer 11, an antenna control layer 12 and at least one second antenna layer 13 which are stacked in sequence, and a dielectric loss tangent value of an interlayer dielectric of the second antenna layer 13 is less than 0.01.

The antenna control layer 12 includes an antenna signal control circuit and an antenna signal sending and receiving circuit.

Specifically, in the present embodiment, an interlayer dielectric material of the second antenna layer 13 is resin with a dielectric constant not greater than 3.9 or a polymer dielectric material with filler. By selecting the material with a low dielectric constant and a low dielectric loss as the interlayer dielectric material of the second antenna layer 13, the dielectric loss and capacitive reactance in the antenna circuit can be reduced, thereby reducing the problems such as current leakage and stray capacitance caused by the dielectric loss.

The antenna support member 2 is disposed on the second antenna layer 13, and has a dielectric loss tangent value less than 0.01.

Further, the first antenna layer 3 is disposed on the antenna support member 2, and is electrically connected to the substrate layer 1 through a conductive through hole 62 or a connecting circuit located in the antenna support member 2. The first antenna layer 3 may also not be electrically connected to the substrate layer 1 through physical contact, but may be electrically connected to the second antenna layer 13 through electromagnetic radiation non-contact. The antenna support member 2 is made of a material with low dielectric loss, so that the antenna circuit forms a heterogeneous and isomerous split structure. As a main component of the antenna circuit and structure, the antenna support member 2 can reduce the dielectric loss in the circuit.

Specifically, the shape of the antenna support member 2 may be specifically set according to a planar arrangement shape of the first antenna layer 3 and the number of antenna modules in the first antenna layer 3. The horizontal profile shape of the antenna support member 2 is approximately similar to the planar arrangement shape of the first antenna layer 3, and a projection of the first antenna layer 3 on the horizontal plane is completely within the profile of the antenna support member 2, so that the antenna support member 2 with a low dielectric loss can reduce the space occupied in the packaging structure while playing a good supporting role for the first antenna.

Furthermore, the antenna support member 2 is one or more of an organic composite single-layer or multi-layer substrate, a glass part and a low-temperature co-fired ceramic part. The organic composite substrate and the glass part have both a low dielectric constant and a low dielectric loss, and the low-temperature co-fired ceramic has a high dielectric constant while having the low dielectric loss. Under the condition of keeping the lower dielectric loss, by using the antenna support members 2 with different dielectric constants, the packaging structure can be applied to the chips S with different use conditions, and the requirement of the packaging structure for high-density integration can be met.

The antenna support member 2 is attached to the substrate layer 1 by a material such as a chip film or adhesive paste, and the chip film or adhesive paste generally has a lower dielectric loss constant and a thickness less than 50 um.

The chip 5 is disposed on the chip circuit layer 11 relative to the antenna support member 2, that is, the chip 5 and the antenna layers are respectively disposed on two opposite surfaces of the substrate layer 1. The antenna layers and the chip 5 are respectively disposed on both sides of the substrate layer 1, on one hand, the circuit layer on the substrate layer 1 can be disposed in layers, the chip 5 and the chip circuit layer 11 are disposed on one side, and the antenna control circuit layer and the antenna layers are disposed on the other side, so that the distribution design can be respectively carried out on the substrate layer 1 in sequence. On the other hand, signal interference of the antenna layers to the chip 5 can be reduced.

In some embodiments of the present invention, underfill 51 may also be disposed between the chip 5 and the chip circuit layer 11. The chip 5 may or may not have a back surface metal.

In some embodiments of the present invention, the antenna packaging structure further includes a microwave integrated circuit and/or a power management chip and/or a passive device disposed on the chip circuit layer 11. The passive device includes a capacitor, a resistor and the like, or other functional devices such as a heat-radiating fin and a reinforcement rib.

The antenna packaging structure further includes the interconnection structural members 6 disposed on the second antenna layer 13 and/or the chip circuit layer 11. The interconnection structural members 6 include antenna-side interconnection structural members 6*a* and chip-side interconnection structural members 6*b*. The antenna-side interconnection structural members 6*a* are at least electrically connected to a grounding circuit on the substrate layer 1. The chip-side interconnection structural members 6*b* are at least electrically connected to signal and grounding circuits on the substrate layer 1.

Further, in the present embodiment, the interconnection structural member 6 includes a main body member 61 made of a dielectric material, and the conductive hole 62 at least located inside the main body member 61 and configured to communicate upper and lower surfaces of the main body member 61. The conductive hole 62 may be a through hole or a folded hole or an interlayer electrical connection hole, and the conductive hole 62 is provided with a metal connector or conductive filler therein to be at least electrically connected to the grounding circuit layer. The interconnection structural members 6 are disposed on the second antenna layer 13 and the chip circuit layer 11, and the antenna-side interconnection structural members 6*a* are distributed in gaps and at peripheral sides of the antenna support member 2, so that the space in the packaging structure can be utilized to the maximum extent.

The upper and lower surfaces of the main body member 61 are plated with designed metal layers, and the metal layers may be higher than, equal to or lower than the upper and lower surfaces of the main body member. The interconnection structural members 6 are at least electrically connected to the grounding circuit layer by soldering tin or conductive adhesive/paste.

Furthermore, the main body member 61 may also be an organic composite single-layer or multi-layer substrate, a glass part and a low-temperature co-fired ceramic part with a low dielectric loss to further reduce the dielectric loss in the packaging structure; or the main body member 61 may also be made of organic polymer resin with inorganic filler, or organic polymer resin with glass fiber cloth and filler, synthetic resin and other polymer materials with a certain structural strength.

The side wall of the interconnection structural member 6 is provided with a heat-radiating structural member 63 and/or a second moisture barrier layer 64.

Specifically, in the present embodiment, the chip-side interconnection structural member 6*b* is provided with the second moisture barrier layer 64 exposed to the plastic packaging layer 4, and the heat-radiating structural member is a columnar or thin-layer structural member made of a material with high thermal conductivity, such as a copper post or an electroplated copper layer, thereby further improving the reliability of the packaging structure under the conditions of high temperature and high humidity.

The upper metal surfaces of the antenna-side interconnection structural members 6*a* may be higher than, equal to or lower than the upper surface of the first antenna layer 3.

Specifically, in the present embodiment, the upper metal surfaces of the antenna-side interconnection structural members 6*a* are flush with the upper surface of the first antenna layer 3.

Figure 2:
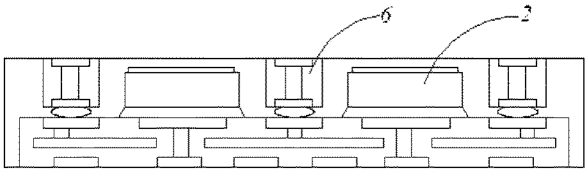
FIG. 2 is a schematic diagram of a substrate layer and antenna layers in an antenna packaging structure in another embodiment of the present invention, in which upper surfaces of interconnection structural members are higher than an upper surface of a first antenna layer.

As shown in FIG. 2, in some other embodiments of the present invention, the upper surfaces of the interconnection structural members 6 are higher than the upper surface of the first antenna layer 3, and the upper surfaces of the interconnection structural members 6 are exposed to the plastic packaging layer 4, so that a heat-radiating capability of the packaging structure can be favorably improved, and other components can be conveniently stacked on the interconnection structural members to expand the packaging structure.

Figure 3:
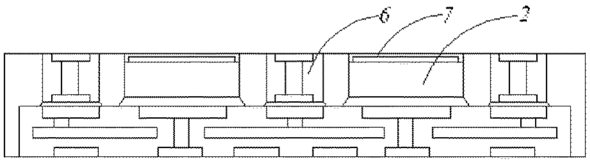
FIG. 3 is a schematic diagram of the substrate layer and the antenna layers in the antenna packaging structure in another embodiment of the present invention, in which the upper surface of an antenna support member is further provided with a first moisture barrier layer.

As shown in FIG. 3, in some other embodiments of the present invention, an upper surface of the antenna support member 2 is further provided with a first moisture barrier layer 7, wherein the first moisture barrier layer 7 wraps the first antenna layer 3, and the upper surfaces of the first moisture barrier layer 7 and the interconnection structural members 6 are exposed to the plastic packaging layer 4. The first moisture barrier layer 7 protects the first antenna layer 3 from moisture and humidity, thus improving the reliability of the packaging structure under high humidity conditions. The exposed interconnection structural members 6 and first moisture barrier layer 7 are beneficial to improving the heat-radiating capability of the packaging structure.

Figure 4:
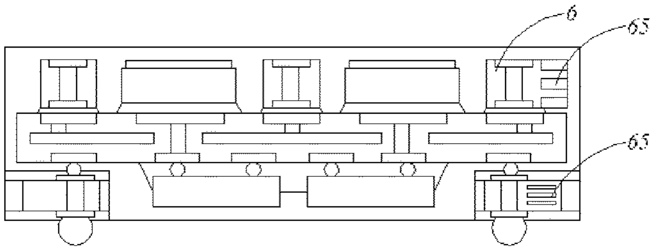
FIG. 4 is a schematic diagram of the antenna packaging structure in another embodiment of the present invention, in which parts of the interconnection structural members located on both sides of the packaging structure are provided with lateral antenna layers.

As shown in FIG. 4, in some other embodiments of the present invention, parts of the interconnection structural member 6 located on both sides of the packaging structure are further provided with lateral antenna layers 65, and the lateral antenna layers 65 are disposed toward side edges of the antenna packaging structure. The interconnection structural members 6 are provided with circuits or conductive connectors therein which are electrically communicated with the lateral antenna layers 65 and the antenna control layer 12.

Figure 5:
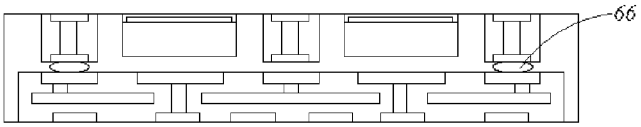
FIG. 5 is a schematic diagram of the substrate layer and the antenna layers in the antenna packaging structure in another embodiment of the present invention, in which the interconnection structural members are a complete blocky structural member.

As shown in FIG. 5, in some other embodiments of the present invention, the antenna-side interconnection structural member 6*a* is a complete blocky structural member, which is at least provided with solder bumps 66 at four corners and the center and is connected to the substrate layer 1 through the solder bumps 66.

Figure 6:
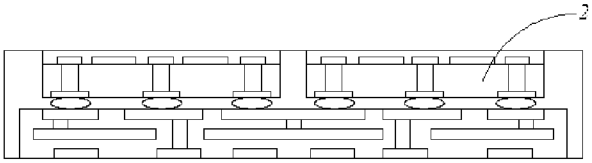
FIG. 6 is a schematic diagram of the substrate layer and the antenna layers in the antenna packaging structure in another embodiment of the present invention, in which the interconnection structural members are integrated in the antenna support member.

As shown in FIG. 6, in some other embodiments of the present invention, the antenna-side interconnection structural members 6*a* are integrated in the antenna support member 2, thereby further improving the integration of the packaging structure.

Figure 7:
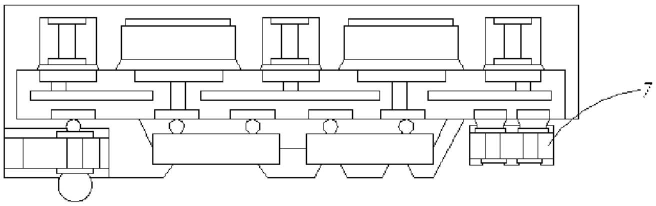
FIG. 7 is a schematic diagram of the antenna packaging structure in another embodiment of the present invention, which is provided with inter-board connectors.

As shown in FIG. 7, in some other embodiments of the present invention, the chip-side interconnection structural members 6*b* are omitted from the packaging structure, and inter-board connectors 7 are disposed instead. The inter-board connector 7 is similar in structure to the chip-side interconnection structural member 6*b*. A conductive circuit or hole 62 is disposed in the dielectric material to be electrically connected to the circuit of the substrate layer 1. It is easier to connect other electronic parts and components or other electronic structures through the inter-board connectors 7, so as to facilitate expansion of the packaging structure.

The plastic packaging layer 4 wraps the substrate layer 1, the antenna support member 2, the first antenna layer 3 and the chip 5. The plastic packaging layer 4 is formed by filling with a plastic packaging material, wherein the plastic packaging material may be a high-molecular polymer composite material with filler, such as epoxy resin, polyimide or a dry film. The plastic packaging layer 4 provides physical support for the packaging structure and protects the elements in the packaging structure.

Further, in the present embodiment, the plastic packaging layer 4 includes a first plastic packaging layer 41 and a second plastic packaging layer 42. The first plastic packaging layer 41 at least wraps the upper surface of the substrate layer 1, the side surface of the antenna support member 2, the side surfaces of the antenna-side interconnection structural members 6*a* and the first antenna layer 3; and the second plastic packaging layer 42 at least wraps the side surface of the chip 5 and the side surfaces of the chip-side interconnection structural members 6*b*. The first plastic packaging layer 41 and the second plastic packaging layer 42 are made of different or the same plastic packaging material. The problem of warpage of the packaging structure can be adjusted by using the differences of thermal expansion coefficients of different plastic packaging materials.

Figure 8:
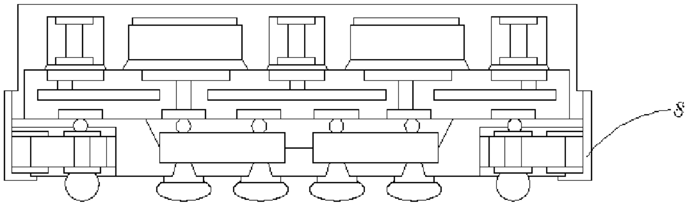
FIG. 8 and FIG. 9 are schematic diagrams of the antenna packaging structure in another embodiment of the present invention, in which an outer side of a packaging layer is further provided with an electromagnetic shielding layer.
Figure 9:
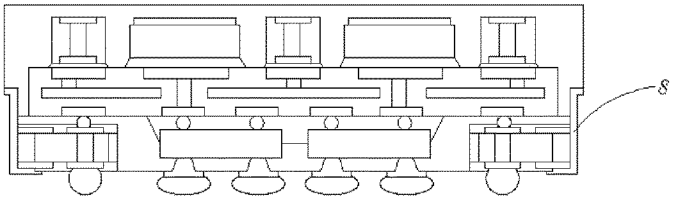

As shown in FIG. 8 and FIG. 9, in some other embodiments of the present invention, the antenna packaging structure is further provided with an electromagnetic shielding layer 8 at the outer side of the packaging layer, and the electromagnetic shielding layer 8 at least covers a side direction of the chip 5 and a side direction or side surface of the chip circuit layer 11, so as to reduce electromagnetic interference on the chip 5. Pads designed by part of the electromagnetic shielding layer 8 may also be bonded to the back surface of the chip 5 by the drilled second plastic packaging layer 42 at the back surface of the chip 5, and tin caps or tin balls may be formed on the pads to improve the heat-radiating or mechanical reliability.

Specifically, the electromagnetic shielding layer 8 includes an adhesive layer attached to the plastic packaging layer 4, a protective layer exposed to air, and a main shielding layer disposed between the adhesive layer and the protective layer. The adhesive layer is made of a metal material with higher adhesion, such as copper, or an organic material with high adhesion, so as to strengthen a bonding strength between the electromagnetic shielding layer 8 and the packaging structure. The main shielding layer is made of a sputtering interlayer metal film material such as copper, stainless steel and titanium, or conductive resin containing high-density metal filler such as silver/copper, and other conductive composite materials, or a combination of at least two of the above materials, as long as the effects of shielding or absorbing electromagnetic waves are achieved. The protective layer is a stainless steel (7% NiV) or CrCu alloy layer, or an organic moisture barrier layer, and the like to further enhance the reliability of the packaging structure under high humidity conditions.

Further, the side wall of the chip-side interconnection structural member 6*b* is provided with a metal structural member, and the metal structural member is exposed to the plastic packaging layer 4 and electrically connected to the electromagnetic shielding layer 8 in a grounding way. The electromagnetic shielding layer 8 may also be electrically connected to the bottom surface metal of the interconnection structural member 6.2 in a grounding way.

According to the difference in the sequence of process steps in a manufacturing process, the position of part of a horizontal cutting surface covered by the electromagnetic shielding layer 8 is different.

Figure 10:
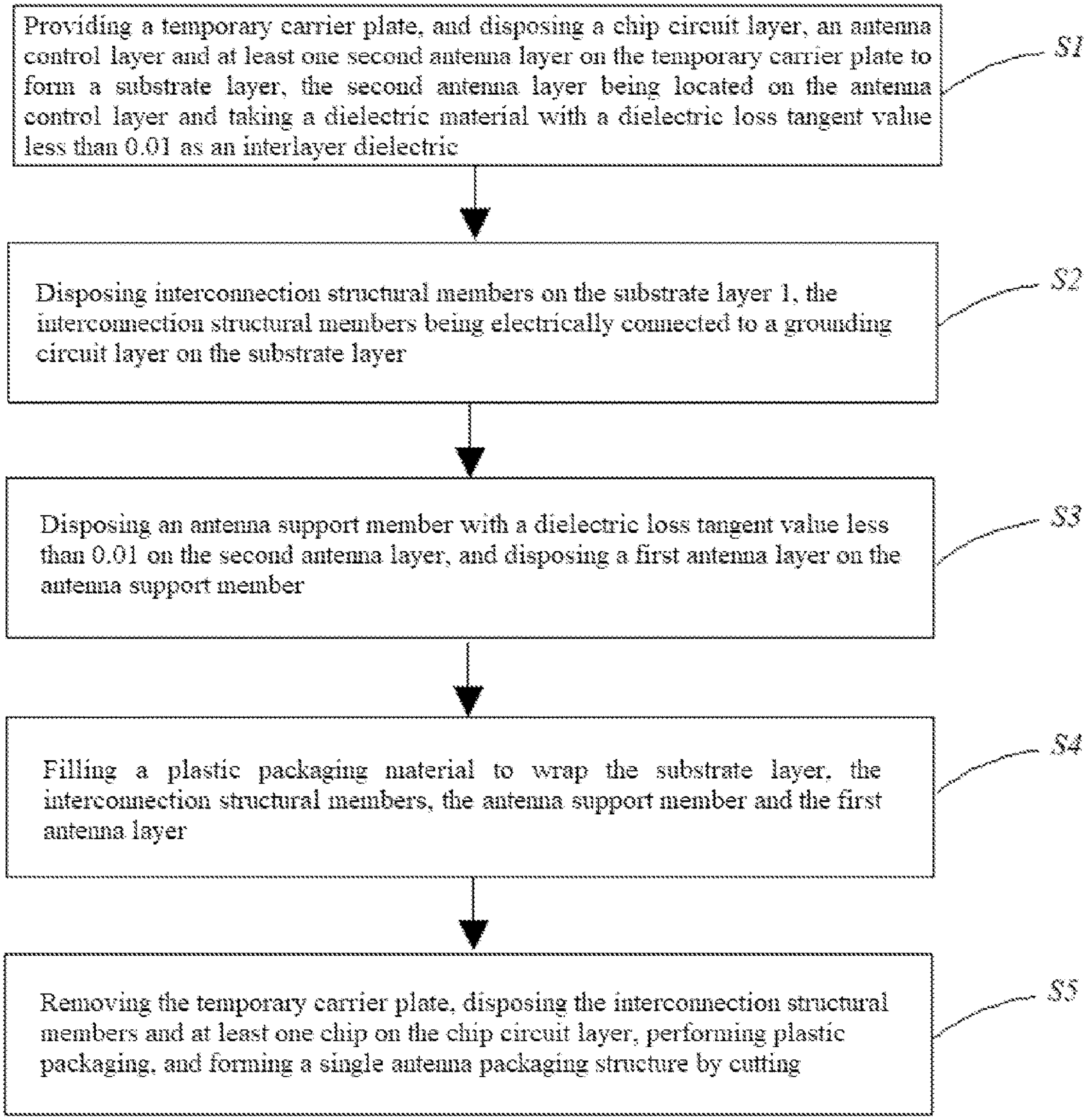
FIG. 10 is a flowchart of manufacturing of an antenna packaging structure in an embodiment of the present invention.

As shown in FIG. 10, the present invention also provides a packaging method of an antenna packaging structure. The packaging method includes the following steps.

Figure 11:
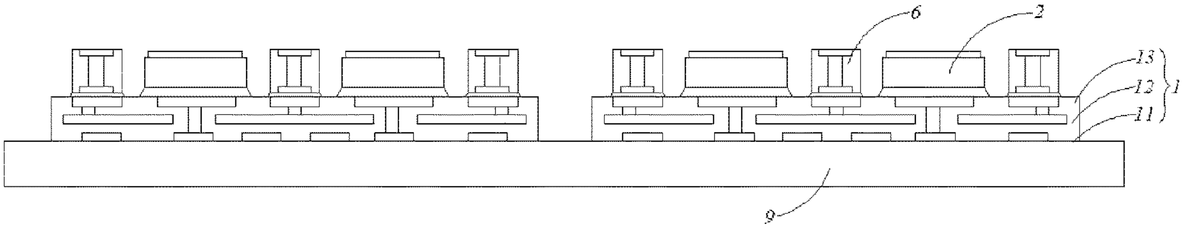
FIG. 11 to FIG. 14 are schematic diagrams of respective steps in a manufacturing process of an antenna packaging structure in an embodiment of the present invention.

In S1, as shown in FIG. 11, a temporary carrier plate 9 is provided, wherein at least one chip circuit layer 11, and at least one antenna control layer 12 and at least one second antenna layer 13 are disposed on the temporary carrier plate 9 to form a substrate layer 1, the second antenna layer 13 being located on the antenna control layer 12 and taking a dielectric material with a dielectric loss tangent value less than 0.01 as an interlayer dielectric. The substrate layer 1 may be a prefabricated substrate strip or single substrate, or a redistribution stacked layer formed by multi-layer fine metal distribution and dielectric layer drilling in the temporary carrier plate.

The temporary carrier plate 9 is a low-cost sacrificial base material, such as glass, silicon or composite polymer, which has a certain rigidity and is provided with a temporary debonding layer or etching barrier layer for structural support. The temporary carrier plate 9 may also be a high-temperature film with a reinforced frame and a single-sided temporary adhesive layer. The temporary carrier plate 9 may be rectangular, square or circular.

Further, the antenna control layer 12 includes an antenna signal control circuit and an antenna signal sending and receiving circuit.

Specifically, in the present embodiment, at least an interlayer dielectric material of the second antenna layer 13 is resin with a dielectric constant not greater than 3.9 or a polymer dielectric material with filler.

In S2, as shown in FIG. 11, interconnection structural members are disposed on the substrate layer 1, and the interconnection structural members are electrically connected to a grounding circuit layer on the substrate layer 1.

Specifically, in the present embodiment, the interconnection structural member 6 includes a main body member 61 made of a dielectric material, and a metal connector located inside the main body member 61 and configured to communicate upper and lower surfaces of the main body member 61, wherein the metal connector is electrically connected to the grounding circuit layer on the substrate layer 1.

The upper and lower surfaces of the main body member 61 are plated with designed metal layers, and antenna-side interconnection structural members 6*a* are electrically connected to the grounding circuit layer by soldering tin or conductive adhesive/paste.

Further, the main body member 61 may be a single-layer or multi-layer organic composite substrate, a glass part and a low-temperature co-fired ceramic part with a low dielectric loss, so as to further reduce the dielectric loss in the packaging structure; or the main body member 61 may also be made of organic polymer resin with inorganic filler, or organic polymer resin with glass fiber cloth and filler, synthetic resin and other polymer materials with a certain structural strength.

In some other embodiments of the present invention, parts of the interconnection structural member located on both sides of the packaging structure are further provided with lateral antenna layers 65, and the lateral antenna layers 65 are disposed toward side edges of the antenna packaging structure.

In some other embodiments of the present invention, the side wall of the interconnection structural member 6 is provided with a heat-radiating structural member 63 and/or a second moisture barrier layer 64, wherein the second moisture barrier layer 64 is exposed to the plastic packaging layer 4.

In some other embodiments of the present invention, the interconnection structural member 6 is a complete blocky structural member, which is at least provided with solder bumps at four corners and the center, and is connected to the substrate layer through the solder bumps.

In S3, as shown in FIG. 11, the antenna support member 2 with a dielectric loss tangent value less than 0.01 is disposed on the second antenna layer 13, and a first antenna layer 3 is disposed on the antenna support member 2.

Specifically, in the present embodiment, the antenna support member 2 is one or more of a single-layer or multi-layer organic composite substrate, a glass part and a low-temperature co-fired ceramic part.

The antenna support member 2 is attached to the substrate layer 1 by a chip back film or adhesive paste.

The interconnection structural members 6 disposed on one side of the second antenna layer 13 are distributed between gaps and at peripheral sides of the antenna support member 2, and the upper surfaces of the interconnection structural members 6 are not lower than the upper surface of the first antenna layer 3.

Figure 12:
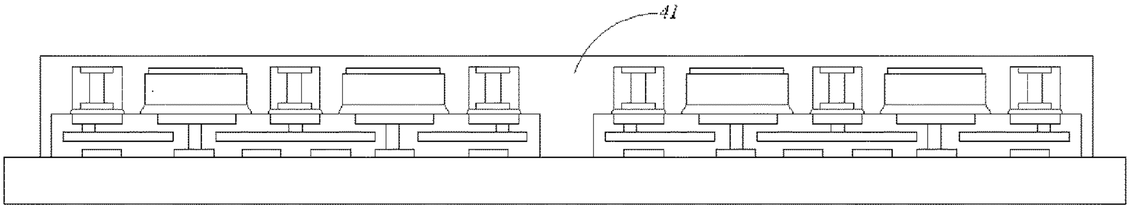

In S4, as shown in FIG. 12, a first plastic packaging layer 41 is filled to wrap the substrate layer 1, the interconnection structural members 6, the antenna support member 2 and the first antenna layer 3.

Organic polymer resin with inorganic filler, or organic polymer resin with glass fiber cloth and filler, or a polymer composite material with filler such as epoxy resin, polyimide or dry film is used as a plastic packaging material to be deposited on the substrate layer 1 to encapsulate the interconnection structural members, the antenna support member 2 and the first antenna layer 3, thereby forming the first plastic packaging layer 41.

When the upper surfaces of the interconnection structural members 6 are much higher than the upper surface of the first antenna layer 3, the plastic packaging layer 4 may be polished to expose the upper surfaces of the interconnection structural members 6.

In some other embodiments of the present invention, before filling of the plastic packaging material, the packaging method further includes the following step:

forming a first moisture barrier layer 7 on an upper surface of the antenna support member 2 before the antenna support member 2 is cut or after the antenna support member 2 is attached to the substrate layer 1, wherein the first moisture barrier layer 7 wraps the first antenna layer 3.

After the filling of the plastic packaging material, according to design and performance requirements, the plastic packaging layer 4 may be polished to expose the upper surfaces of the interconnection structural members 6 and the upper surface of the first moisture barrier layer 7. In one implementation method, the upper surfaces of the interconnection structural members 6 and/or the upper surface of the first moisture barrier layer 7 may be directly protected during the plastic packaging process, so that no plastic packaging layer covers the upper surfaces of the interconnection structural members 6 and/or the upper surface of the first moisture barrier layer 7.

Figure 13:
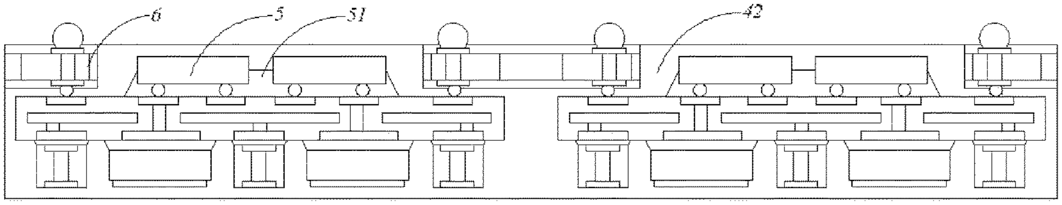
Figure 14:
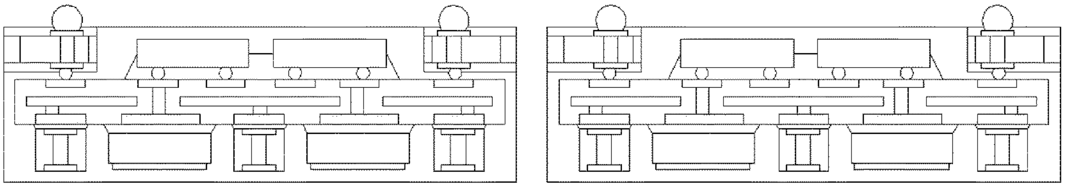

In S5, as shown in FIG. 13 and FIG. 14, the temporary carrier plate 9 is removed, the interconnection structural members 6 and at least one chip 5 are disposed on the chip circuit layer 11, and the chip 5 may or may not have a back surface metal. A second plastic packaging layer 42 is formed, and a single antenna packaging structure is formed by cutting. In one implementation method, before final cutting, the second plastic packaging layer 42 may be thinned and/or laser-drilled/grooved to expose interface pads of the chip-side interconnection structural members **6*b* and/or at least part of the back surface of the chip 5, and then tin caps or tin balls cover the interface pads of the chip-side interconnection structural members 6*b*** and/or the back surface metal.

The temporary carrier plate 9 is peeled off by laser debonding separation, mechanical peeling, chemical etching, mechanical grinding and other methods.

The complete packaging structure is divided into individual packaging structures along a cutting path by a saw blade or a laser cutting apparatus.

Further, in some embodiments of the present invention, before plastic packaging of the chip 5, the packaging method further includes the following step:

coating underfill 51 between the chip 5 and the chip circuit layer 11.

Further, in some embodiments of the present invention, the packaging method, while disposing the chip 5, also includes the step:

disposing a microwave integrated circuit and/or power management chip and/or passive device on the chip circuit layer 11. The passive device includes a capacitor, a resistor and the like, or other functional devices such as a heat-radiating fin or a reinforcement rib.

In some embodiments of the present invention, before cutting to form the single antenna packaging structure, the packaging method further includes the steps:

partially cutting the plastic packaging layer; and sequentially depositing an adhesive layer, a main shielding layer and a protective layer on the outer side of the antenna packaging structure to form an electromagnetic shielding layer 8, wherein the electromagnetic shielding layer 8 at least covers the side direction of the chip 5 and the side direction or side surface of the chip circuit layer 11.

Specifically, the electromagnetic shielding layer 8 includes an adhesive layer attached to the plastic packaging layer 4, a protective layer exposed to air, and a main shielding layer disposed between the adhesive layer and the protective layer. The adhesive layer is made of a metal material with higher adhesion, such as copper, or an organic material with high adhesion. The main shielding layer is made of a sputtering interlayer metal film material such as copper, stainless steel or titanium, or conductive resin containing high-density metal filler such as silver/copper, and other conductive composite materials, or a combination of at least two of the above materials. The protective layer is a stainless steel (7% NiV) or CrCu alloy layer, or an organic moisture barrier layer, etc.

It should be noted that the sequence of part of steps in the present invention may be exchanged and adjusted, for example, step S2 and step S3 may be exchanged or carried out simultaneously. For example, the chip 5 and the substrate layer 2 may be disposed on the temporary carrier plate 9 at first, and then the temporary carrier plate 9 is removed to form the antenna support member 2 and the antenna layers, etc., as long as the chip and the antenna layer packaging structure which are relatively distributed can be formed.

In summary, according to the present invention, an antenna and the chip are respectively disposed on two sides of the substrate layer, the antenna layers are formed by the antenna support member, the first antenna layer located above the antenna support member and the second antenna layer located below the antenna support member together, and the interlayer dielectrics of the antenna support member and the antenna layers are low dielectric loss materials, so that a heterogeneous and isomerous antenna structure is formed, thereby reducing the problems such as current leakage and stray capacitance in the packaging structure caused by dielectric loss, and favorably reducing a size of the antenna packaging structure.

It should be understood that, although the description is described in terms of the embodiments, each of the embodiments is not intended to contain an independent technical solution. Such description manner of the description is merely intended for clarity. Those skilled in the art should take the description as a whole, and the technical solutions in respective embodiments may also be combined appropriately to form other embodiments understandable by those skilled in the art.

The series of detailed descriptions listed above are merely specifically illustrative of the possible embodiments of the present invention, and are not intended to limit the protection scope of the present invention. The equivalent embodiments or alterations made without departing from the technology and spirit of the present invention should be included within the protective scope of the present invention.

What is claimed is:

1. An antenna packaging structure, wherein the antenna packaging structure comprises a substrate layer, at least one antenna support member, a first antenna layer, a plastic packaging layer and at least one chip;

the substrate layer comprises at least one chip circuit layer, at least one antenna control layer and at least one second antenna layer which are stacked in sequence, and a dielectric loss tangent value of an interlayer dielectric of the second antenna layer is less than 0.01;

the antenna support member is disposed on the second antenna layer, and has a dielectric loss tangent value less than 0.01;

the first antenna layer is disposed on the antenna support member and electrically connected to the second antenna layer through electromagnetic radiation or physical contact;

the chip and the antenna support member are respectively disposed on two opposite surfaces of the substrate layer, and the chip is disposed on the chip circuit layer; and the plastic packaging layer wraps the substrate layer, the antenna support member, the first antenna layer and the chip.

2. The antenna packaging structure according to claim 1, wherein the antenna support member is one or more of an organic composite substrate, a glass part and a low-temperature co-fired ceramic part, at least an interlayer dielectric material of the second antenna layer is resin with a dielectric constant not greater than 3.9 or a polymer dielectric material with filler.

3. The antenna packaging structure according to claim 2, wherein the antenna control layer comprises an antenna signal control circuit and an antenna signal sending and receiving circuit.

4. The antenna packaging structure according to claim 2, wherein an upper surface of the antenna support member is further provided with a first moisture barrier layer, and the first moisture barrier layer wraps the first antenna layer and is exposed to or buried in the plastic packaging layer.

5. The antenna packaging structure according to claim 2, wherein the antenna packaging structure further comprises interconnection structural members disposed on the second antenna layer and/or the chip circuit layer, the interconnection structural members on the second antenna layer are at least electrically connected to a grounding circuit of the substrate layer, and the interconnection structural members on the chip circuit layer are electrically connected to the substrate layer.

6. The antenna packaging structure according to claim 5, wherein the interconnection structural member comprises a main body member made of a dielectric material, and a conductive hole at least located inside the main body member and configured to communicate upper and lower surfaces of the main body member, a metal connector or conductive filler is disposed in the conductive hole to be at least electrically connected to the grounding circuit layer, and the interconnection structural members disposed on one side of the second antenna layer are distributed in gaps and at peripheral sides of the antenna support member.

7. The antenna packaging structure according to claim 5, wherein parts of the interconnection structural members located on both sides of the packaging structure are further provided with lateral antenna layers, and the lateral antenna layers are disposed toward side edges of the antenna packaging structure, a side wall of the interconnection structural member is provided with a heat-radiating structural member and/or a second moisture barrier layer, and the second moisture barrier layer is exposed to or buried in an outer side of the plastic packaging layer.

8. The antenna packaging structure according to claim 5, wherein the plastic packaging layer comprises a first plastic packaging layer and a second plastic packaging layer, the first plastic packaging layer at least wraps an upper surface of the substrate layer, a side surface of the antenna support member, side surfaces of the interconnection structural members and the first antenna layer, the second plastic packaging layer at least wraps a side surface of the chip and the side surfaces of the interconnection structural members, and a material of the first plastic packaging layer and a material of the second plastic packaging layer are the same or different.

9. The antenna packaging structure according to claim 5, wherein the antenna packaging structure is further provided with an electromagnetic shielding layer at the outer side of the packaging layer; the electromagnetic shielding layer at least covers a side direction of the chip and a side direction of the chip circuit layer; the electromagnetic shielding layer comprises an adhesive layer attached to the plastic packaging layer, a protective layer exposed to air, and a main shielding layer disposed between the adhesive layer and the protective layer; the side wall of the interconnection structural member is provided with a metal structural member; the metal structural member is exposed to the plastic packaging layer and electrically connected to the electromagnetic shielding layer in a grounding way; and part of the electromagnetic shielding layer forms pads on a back surface of the chip or is bonded to the back surface of the chip through the drilled plastic packaging layer to form the pads.

10. The antenna packaging structure according to claim 1, wherein the antenna packaging structure further comprises a microwave integrated circuit and/or a power management chip and/or a passive device disposed on the chip circuit layer.

11. A packaging method of an antenna packaging structure according to claim 1, comprising the following steps:

providing a temporary carrier plate, and disposing a chip circuit layer, an antenna control layer and at least one second antenna layer on the temporary carrier plate to form a substrate layer, the second antenna layer being located on the antenna control layer and taking a dielectric material with a dielectric loss tangent value less than 0.01 as an interlayer dielectric;

disposing interconnection structural members on the substrate layer, the interconnection structural members being electrically connected to a grounding circuit layer on the substrate layer;

disposing at least one antenna support member with a dielectric loss tangent value less than 0.01 on the second antenna layer, and disposing a first antenna layer on the antenna support member;

filling a first plastic packaging layer to wrap the substrate layer, the interconnection structural members, the antenna support member and the first antenna layer; and removing the temporary carrier plate, disposing the interconnection structural members and at least one chip on the chip circuit layer, forming a second plastic packaging layer by filling, and forming a single antenna packaging structure by cutting.

12. The packaging method according to claim 11, wherein the antenna support member is one or more of an organic composite substrate, a glass part and a low-temperature co-fired ceramic part, at least an interlayer dielectric material of the second antenna layer is resin with a dielectric constant not greater than 3.9 or a polymer dielectric material with filler.

13. The packaging method according to claim 11, wherein the first plastic packaging layer at least wraps an upper surface of the substrate layer, a side surface of the antenna support member, side surfaces of the interconnection structural members and the first antenna layer, and the second plastic packaging layer at least wraps a side surface of the chip and the side surfaces of the interconnection structural members; and a material of the first plastic packaging layer and a material of the second plastic packaging layer are different.

14. The packaging method according to claim 11, wherein the chip circuit layer comprises an antenna signal control circuit and an antenna signal sending and receiving circuit.

15. The packaging method according to claim 11, further comprising the following step:

forming a first moisture barrier layer on an upper surface of the antenna support member, the first moisture barrier layer wrapping the first antenna layer.

16. The packaging method according to claim 11, wherein the interconnection structural member comprises a main body member made of a dielectric material, and a metal connector at least located inside the main body member and configured to communicate upper and lower surfaces of the main body member, and the metal connector is at least electrically connected to the grounding circuit layer on the substrate layer.

17. The packaging method according to claim 16, wherein the interconnection structural members disposed on one side of the second antenna layer are distributed in gaps and at peripheral sides of the antenna support member.

18. The packaging method according to claim 17, wherein parts of the interconnection structural members located on both sides of the packaging structure are further provided with lateral antenna layers, and the lateral antenna layers are disposed toward side edges of the antenna packaging structure, a side wall of the interconnection structural member is provided with a heat-radiating structural member and/or a second moisture barrier layer, and the second moisture barrier layer is exposed to or buried in the plastic packaging layer.

19. The packaging method according to claim 11, before forming the single antenna packaging structure by cutting, further comprising the following steps:

partially cutting the first plastic packaging layer or the second plastic packaging layer; and sequentially depositing an adhesive layer, a main shielding layer and a protective layer on the outer side of the antenna packaging structure to form an electromagnetic shielding layer, the electromagnetic shielding layer at least covering the chip and the chip circuit layer.

20. The packaging method according to claim 11, wherein the antenna packaging structure further comprises a microwave integrated circuit, a power management chip and a passive device disposed on the chip circuit layer.

* * * * *